Jan. 26, 1926.

J. G. CARROLL

BRAKE CONSTRUCTION

Filed June 12, 1923

Witnesses:
W. F. Kilroy
Harry R. L. White

Inventor:
John G. Carroll

Jan. 26, 1926.

J. G. CARROLL 1,570,942

BRAKE CONSTRUCTION

Filed June 12, 1923          4 Sheets-Sheet 2

Witnesses:

Inventor:
John G. Carroll

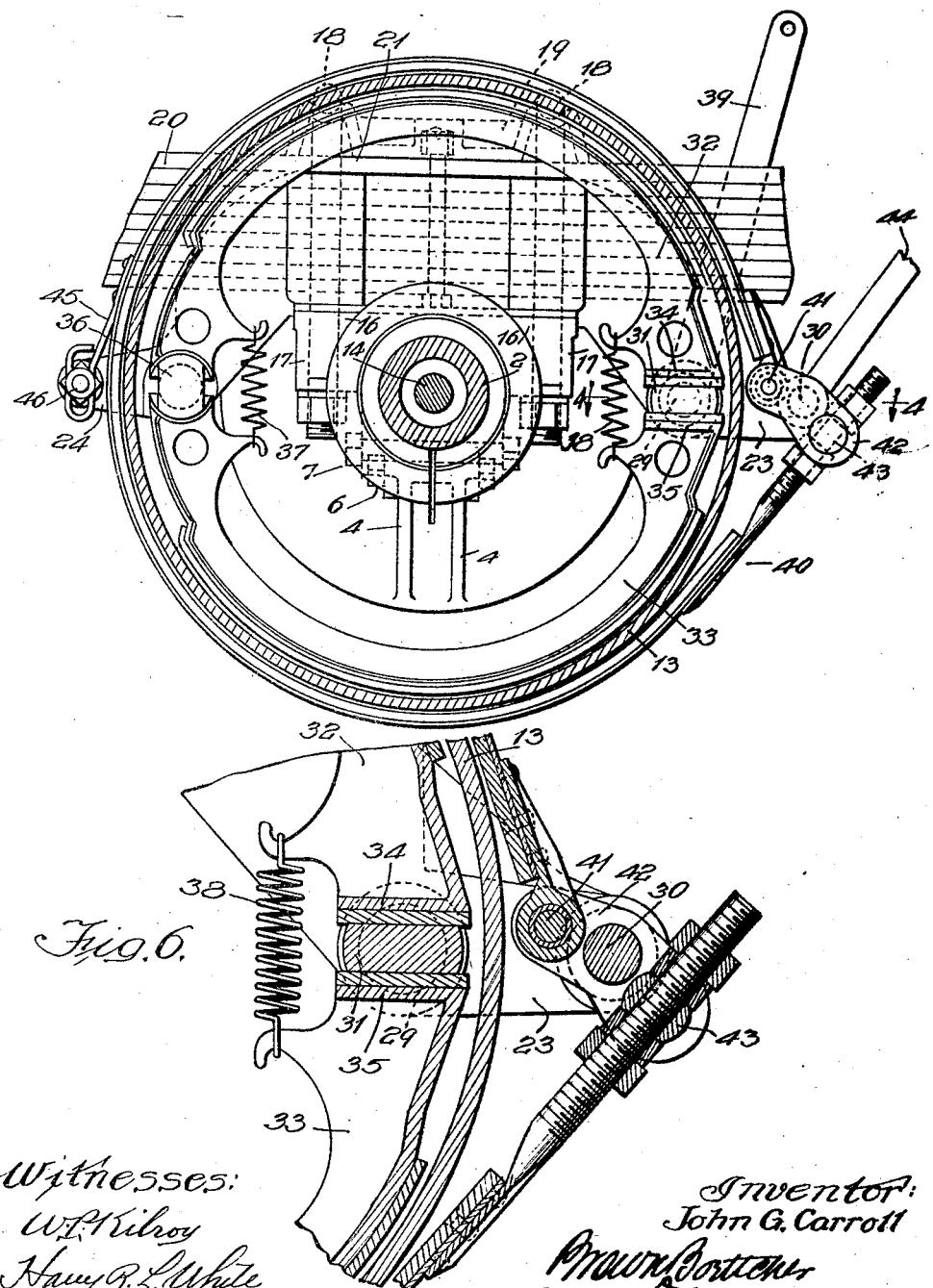

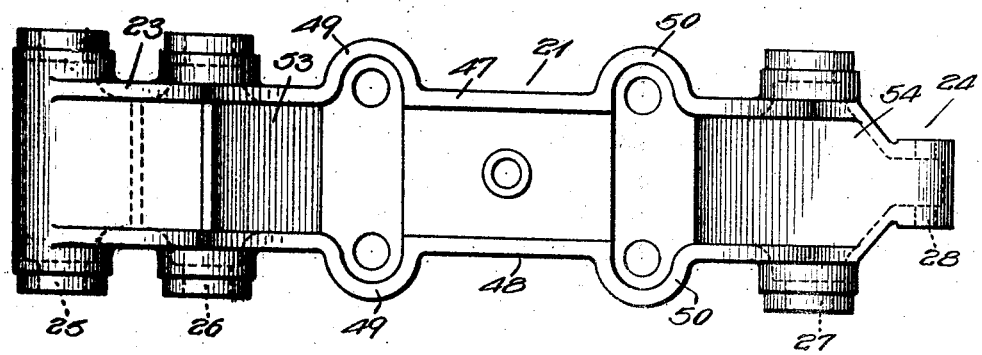
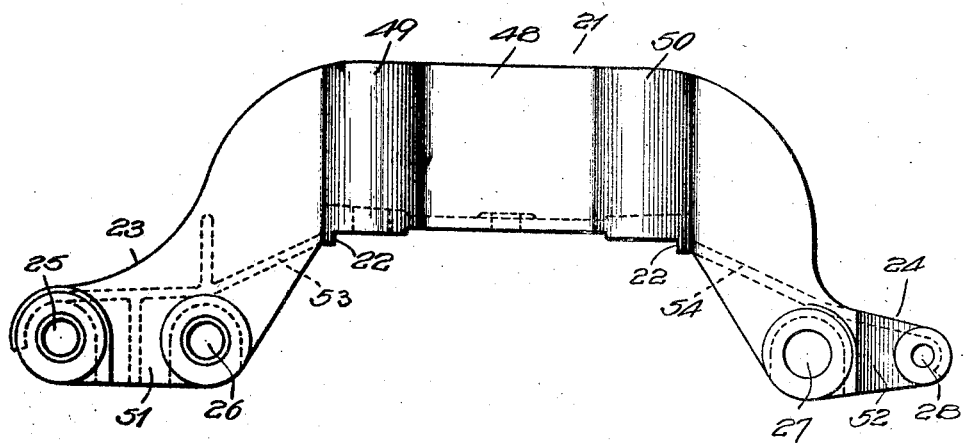
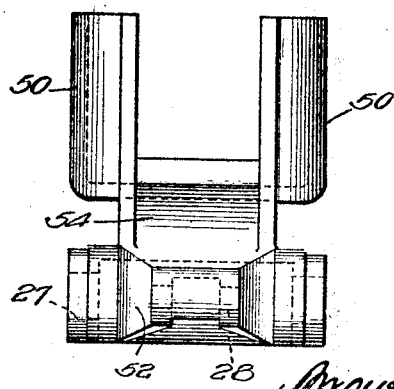

Patented Jan. 26, 1926.

1,570,942

UNITED STATES PATENT OFFICE.

JOHN G. CARROLL, OF CHICAGO, ILLINOIS, ASSIGNOR TO WALKER VEHICLE COMPANY, OF CHICAGO, ILLINOIS, A CORPORATION OF ILLINOIS.

BRAKE CONSTRUCTION.

Application filed June 12, 1923. Serial No. 644,905.

*To all whom it may concern:*

Be it known that I, JOHN G. CARROLL, a citizen of the United States, residing at Chicago, in the county of Cook and State of Illinois, have invented a certain new and useful Improvement in Brake Construction, of which the following is a full, clear, concise, and exact description, reference being had to the accompanying drawings, forming a part of this specification.

My invention relates to brakes for vehicles.

It is well known that the effect of applying the brake to the wheels of a moving vehicle is to create a stress between the wheels which are held back, and all connected parts which tend to go on. This stress between body and wheels is added to the stresses caused by irregularities of the road, and it is not infrequent that these stresses result in a shifting of the axle on the spring with a consequent complete disarrangement of the brake mechanism. It is customary to mount the brake mechanism rigidly on the end of the axle, and it is advisable to bring the attachment of the spring as close to the wheel as is possible, in order to reduce the leverage of the wheel upon the spring attachment.

As heretofore constructed, it has been common practice to provide a flange or housing for the brake drum and to mount the brake shafts upon said flange or housing in a more or less unitary assembly. This generally requires space for attachment between the brake and the spring, which space can not well be devoted to this purpose.

In the case of the employement of stub axles inserted into sockets in the ends of the housing or frame, such as is the case in connection with the "Walker drive," such a flange or drum is undesirable because the tubular end of the housing is split to form a split clamp about the axle stub, and such a flange or drum is inconsistent with an easy opening or closing of the split clamp.

Furthermore, such a construction provides generally only a short bearing for the brake shaft, where a long firm bearing is highly desirable.

According to the present invention, I provide a support for the brake operating or cam shaft, and hinge shaft, which is firmly fixed to the axle housing in a way which prevents possible fore-and-aft displacement due to road or braking stresses, and which, at the same time, does not interfere with the removal or replacement of the stub axle.

I prefer to make this a separate piece which is separately manufactured and applied to the axle housing and which may, therefore, be renewed or replaced, if so desired, with a minimum of difficulty.

In the preferred form of my invention I combine this hanger for the brake shaft with a clip for clamping the springs to the axle housing and thus secure a double function which is highly advantageous.

In order to acquaint those skilled in the art with the preferred manner of constructing and operating my invention, I shall now describe the same in connection with the accompanying drawings in which Fig. 1 is a top plan view of a brake mechanism and spring connection embodying my invention;

Fig. 2 is a vertical section taken on the line 2—2 of Fig. 1;

Fig. 5 is a transverse vertical section taken on the line 5—5 of Fig. 3;

Fig. 6 is an enlarged detail sectional view taken on the line 6—6 of Fig. 3, and Figures 7, 8 and 9 are plan, side and rear elevational views, respectively, of the spring pedestal.

Figure 3:
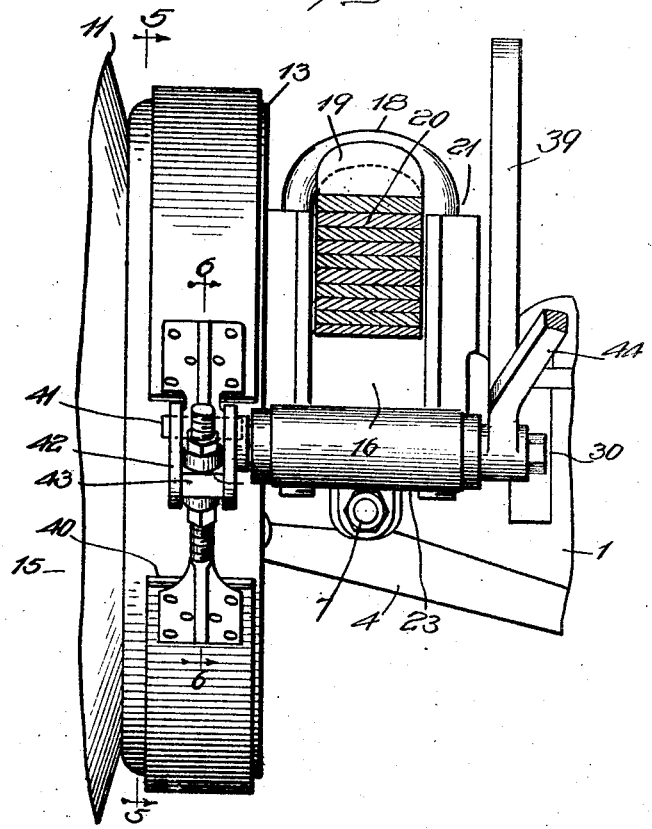
Fig. 3 is rear elevation partly in section.
Figure 4:
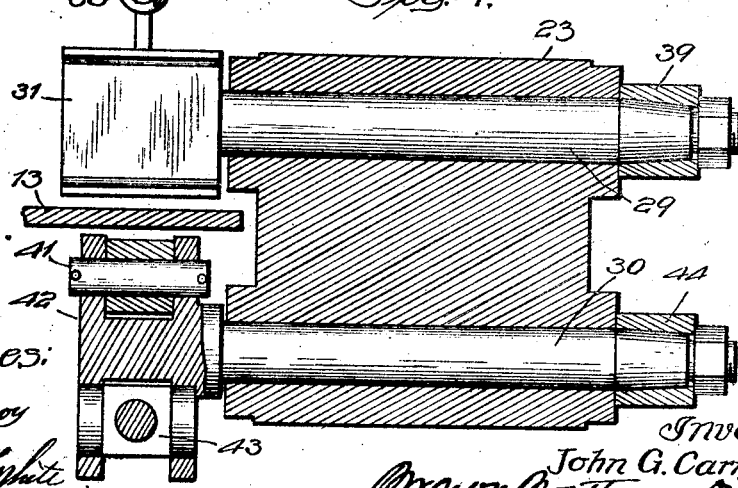
Fig. 4 is a fragmentary sectional view illustrating the mounting of the operating shaft, this view being taken on the line 4—4 of Fig. 5.

The embodiment which I have selected to illustrate is shown in connection with the construction of rear axle housing and wheel mounting which is employed in connection with the well known "Walker drive." A hollow rear axle housing 1 has the tubular ends forming sockets for axle stubs 2 upon the outer ends of which are formed yoke members 3 for mounting the element of the Walker drive. The tubular extension 3 is split along its lower portion, and suitable clamping flanges 4 are provided on opposite sides of the splits. A clamping bolt 5 passes through suitable clamping lugs 6 formed on the flanges 4, and a key bolt 7 serves both to clamp the split socket upon said stub 2, and also serves to locate and key the stub 2 in the socket, the said bolt and the stub intersecting to prevent accidental endwise play of the stub in said socket. The stub axle 2 has suitable wheel bearings of which only the inner bearing 8 is indicated in dotted lines in Fig. 2. The inner race of this set of bearings is mounted between a shoulder on the yoke member 3 and the end of the tubular extension 3 of the axle housing. The outer race is mounted in a ring or hub member 9 which has an outwardly extending flange 10 to which is attached the disc 11 of the wheel. The outer bearing is constructed in a generally similar manner, as will be apparent from my co-pending application, Ser. No. 644,906, filed June 12, 1923, Case 4, and issued April 29, 1924, as Patent No. 1,492,356 in which this construction is shown in detail. The brake drum 13 has an inwardly extending flange 12 which lies against and is secured to the wheel disc 11. I shall indicate the wheel with its attached bearings, brake drum and the like, by the reference numeral 15.

The tubular housing extension 3 has laterally extending flanges 16 substantially flush with the upper surface thereof for performing the dual function of providing a spring seat, and also of strengthening the axle housing against fore-and-aft stresses. Tubular extensions 17 formed integral with the flanges 16 and the tubular extension 3 of the axle housing form suitable sockets for receiving the ends of the clamping bolts 18, these bolts in the present case being illustrated as U-bolts extending over a clamping plate 19, which clamping plate is seated on top of the central part of the vehicle spring 20 and forms a spring clip.

It will be apparent that instead of using the U-bolt and particular spring clip 19 illustrated, I might employ four straight bolts passing through holes in the corner of a suitable clamping plate for performing the same function.

The vehicle spring 20 does not rest directly upon the base or flange 16, but rests instead in a suitable spring pedestal 21, the lower surface of which forms a yoke leading firmly over said flange 16 and having shoulders 22 fitting down over the adjacent edges of said flanges 16, so that when the pedestal is clamped down upon the axle housing said pedestal is immovable on said housing in a fore-and-aft direction because of the parts of engagement or keying which is thereby effected.

The spring pedestal is provided with depending end portions 23 and 24 which have the transverse bearings 25, 26, 27 and bolt hole 28 therein, all arranged on a major diameter of the vehicle wheel and its brake drum 13.

The bearings 25 and 26 are bushed to receive the operating shafts 29 and 30, the shaft 29 being provided at its inner end within the brake drum 13 with a suitable double cam member 31 for spreading the brake jaws 32 and 33. These brake jaws are provided with cooperating bearing flanges 34 and 35 at the ends adjacent the cam 31, so that they may be spread and forced into engagement with the interior braking surface of the drum 13. At their opposite ends the brake jaws 32 and 33 are mounted upon a suitable stationary pivot pin 36, which holds the brake shoes 32 and 33 against circumferential displacement or lateral displacement. The brake shoes 32 and 33 are held normally out of contact with the drum by suitable springs 37 and 38, as is well understood in the art.

The shaft 29 is journaled in the bearing 26 in the pedestal member 21, above referred to, and is provided at its inner end with an operating lever 39 which may be actuated in any well known manner.

The bearing 25 mounts an operating shaft 30 for actuating the external contracting brake 40, which has a suitable brake band, one end of which is attached at 41 to the contracting lever 42. The opposite end of the band is connected to the opposite end of the lever 42 through the medium of a suitable adjustable connection 43 which permits of adjustment of the length of the brake band, and hence the tightness thereof. The operating shaft 30 is connected to a suitable operating lever 44 which may be actuated in any well known manner.

The brake band has attached thereto a spring clip 45 which embraces a bolt 46, which bolt passes through the bolt hole 28 in the outer end of the depending arm 24. This clip 45 serves to prevent sidewise play in the brake band and keeps the same centered on the brake drum without interfering with the tightening or loosening thereof. Both the internal brake shoes and the external brake band or strap are provided with suitable facing or friction surface in the well known manner.

The extensions 23 and 24 are joined to the main body of the pedestal by suitable vertical flanges 47 and 48 which serves the double function of strengthening the pedestal, and also of forming guides for the vehicle spring 20. These flanges are extended outwardly as indicated at 49 and 50 on each side to surround the corresponding spring clamping bolts 18 without weakening the pedestal at such points. The pedestal is made skeleton in form in order to lighten the same as much as is possible consistent with suitable strength. While the pedestal is shown as seating upon a flat surface and having shoulders depending down over the edge of the same, it is to be understood that this particular form is not the only form in which the pedestal can be seated firmly and securely without endwise movement, but the form which I have shown is highly advantageous. It will be understood that the pedestal may be used for an underslung spring, as well as an overslung spring, such as I have shown.

It is further to be noted, that while I have shown the spring as being provided with a center bolt, it will be understood that any suitable form of spring holding means may be employed in this connection. For example, the well known form of reverse center bend may be employed for centering the spring leaves. I do not intend to be limited to the particular manner of skeletonizing this spring pedestal, but I have found the above form with the vertical flanges 47 and 48 running up above the spring seat and yoke portion, and the depending flanges 51 and 52 lying below the horizontal webs 53 and 54, and supporting the bearings and bolts, to be highly advantageous and to be satisfactory in operation.

I claim:—

1. A spring pedestal comprising a central substantially horizontal web having vertical longitudinal flanges at its margins forming side supports or guides for a spring, depending portions at each end of said pedestal for straddling a support and preventing fore and aft movement of the pedestal relative the support, comprising a central transverse web joined to said flanges, and depending flanges having aligned apertures therethrough for supporting brake operating shafts.

2. A spring pedestal comprising a central substantially horizontal web having at its under surface depending shoulders, vertical longitudinal flanges along the margins of said web forming guides for a spring, diagonal web portions at each end joined to said flanges and having extensions of said flanges extending below the diagonal web portions, transverse apertures through said depending flanges forming mountings for brake rigging.

3. A spring pedestal comprising a central substantially horizontal web having vertical longitudinal flanges along its margins forming guides for a spring, depending end portions comprising central transverse web members joined to the flanges and to the first web member, depending flanges forming continuations of said first-named flanges, transverse apertures through said depending end portions, said apertures having bushings for forming journals for an internal brake shaft and external brake shaft at one depending end, the apertures at the other end being adapted to receive holding means for holding the internal and external brake mechanism in place.

4. In a device of the class described, an axle housing having a slotted or split socket for receiving a stub axle, a stub axle for said socket, said stub axle bearing a wheel, means for closing said split socket upon said stub axle, a spring pedestal having a yoke portion seating upon the axle housing and having a seat or saddle for a vehicle spring, and means for holding the spring on its seat and holding the yoke immovably upon the axle housing.

5. A pedestal for a spring and brake mounting comprising a yoke portion having depending ends, said ends having transverse holes therethrough for supporting brake operating members, vertically extending flanges adapted to lie along the sides of a spring, bolt holes down through the sides of the yoke member, said vertical flanges being discontinued around said bolt holes to permit the bolts to lie next to the spring.

6. A spring pedestal comprising a yoke member adapted to be keyed to an axle, depending end portions lying in line with each other and at opposite ends of said yoke member, said end portions having transverse bearings for brake shafts, vertically disposed flanges adapted to lie along the sides of a spring, and holes passing down through the yoke portion for clamping a spring between said flanges and for clamping the yoke upon an axle housing.

In witness whereof, I hereunto subscribe my name this 7 day of June, 1923.

JOHN G. CARROLL